United States Patent
McMullen

(10) Patent No.: US 11,323,535 B2
(45) Date of Patent: May 3, 2022

(54) MANAGEMENT OF EDGE DICTIONARIES IN A CONTENT DELIVERY NETWORK

(71) Applicant: Fastly, Inc., San Francisco, CA (US)

(72) Inventor: Tyler B. McMullen, San Francisco, CA (US)

(73) Assignee: Fastly, Inc., San Francisco, CA (US)

( * ) Notice: Subject to any disclaimer, the term of this patent is extended or adjusted under 35 U.S.C. 154(b) by 1051 days.

(21) Appl. No.: 15/446,246

(22) Filed: Mar. 1, 2017

(65) Prior Publication Data

US 2017/0257453 A1    Sep. 7, 2017

Related U.S. Application Data

(60) Provisional application No. 62/301,711, filed on Mar. 1, 2016.

(51) Int. Cl.
  *G06F 15/16*    (2006.01)
  *H04L 67/568*   (2022.01)
  *H04L 67/02*    (2022.01)
  *H04L 29/06*    (2006.01)

(52) U.S. Cl.
  CPC ........ *H04L 67/2842* (2013.01); *H04L 63/102* (2013.01); *H04L 67/02* (2013.01); *H04L 63/168* (2013.01)

(58) Field of Classification Search
  CPC .......................... H04L 67/2842; H04L 67/02
  See application file for complete search history.

(56) References Cited

U.S. PATENT DOCUMENTS

| | | | |
|---|---|---|---|
| 6,026,474 A | 2/2000 | Carter et al. | |
| 7,770,122 B1 | 8/2010 | Shaik | |
| 2008/0126531 A1* | 5/2008 | Setia | H04W 48/02 709/224 |
| 2011/0246503 A1* | 10/2011 | Bender | G06F 9/546 707/769 |
| 2011/0252192 A1 | 10/2011 | Busch et al. | |
| 2014/0189859 A1* | 7/2014 | Ramanan | G06F 21/56 726/22 |
| 2015/0026315 A1* | 1/2015 | Bergman | H04L 41/5041 709/220 |
| 2016/0103845 A1 | 4/2016 | Yeddanapudi et al. | |
| 2016/0241528 A1* | 8/2016 | Kulkarni | H04L 67/2842 |

* cited by examiner

*Primary Examiner* — Padma Mundur

(57) ABSTRACT

Described herein are enhancements for operating cache nodes in a content delivery network to synchronize edge dictionary configurations. In at least one implementation, a cache node of a content delivery network receives a content request from an end user device. In response to the request, the cache node identifies a modification to a key-value pair of an edge dictionary, wherein the edge dictionary comprises a reference key-value function for a Hypertext Transfer Protocol (HTTP) accelerator service. The method further provides generating a modified version of the edge dictionary based on the modification, and transferring a notification of the modification to at least one other cache node in the content delivery network.

20 Claims, 8 Drawing Sheets

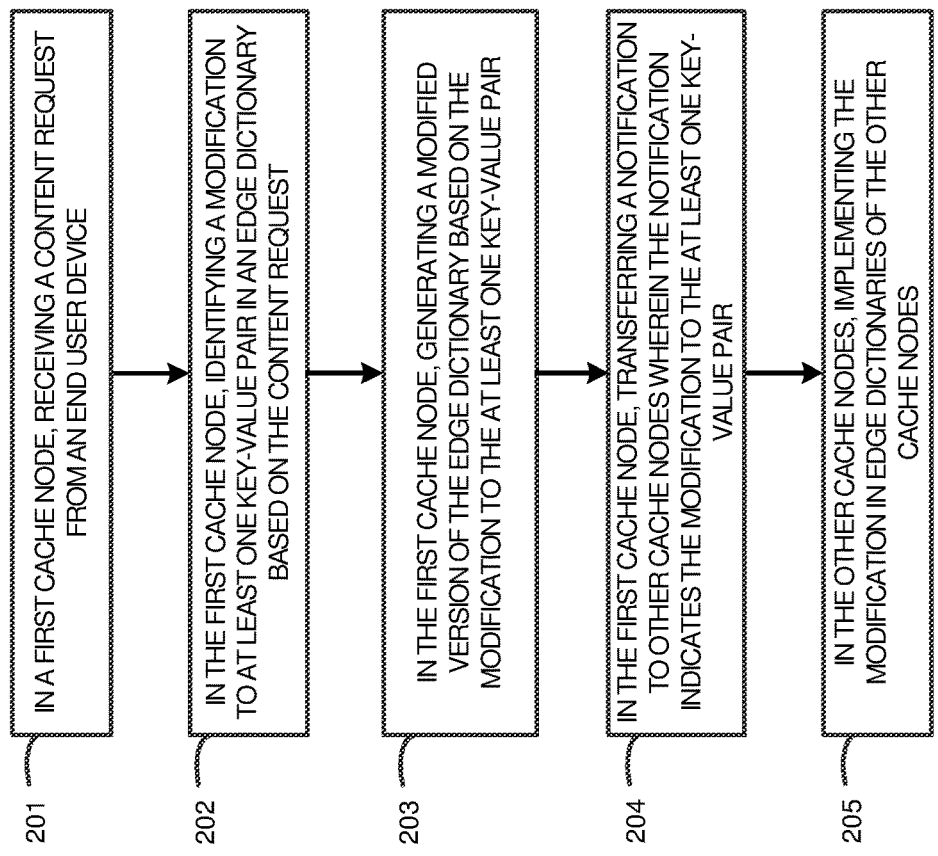

MANAGEMENT OF EDGE DICTIONARIES IN A CONTENT DELIVERY NETWORK

RELATED APPLICATIONS

This application hereby claims the benefit of and priority to U.S. Provisional Patent Application 62/301,711, titled "MANAGEMENT OF EDGE DICTIONARIES IN A CONTENT DELIVERY NETWORK," filed Mar. 1, 2016, and which is hereby incorporated by reference in its entirety.

TECHNICAL BACKGROUND

Network-provided content, such as Internet web pages or media content such as video, pictures, music, and the like, are typically served to end users via networked computer systems. End user requests for the network content are processed and the content is responsively provided over various network links. These networked computer systems can include hosting servers, which host network content of content creators or originators, such as web servers for hosting a news website. However, these originating computer systems can become overloaded and slow due to frequent requests of content by end users.

To assist the origin servers, content delivery networks have been developed that create a layer of caching between the origin servers and the end users. These content delivery networks typically have one or more content nodes, or cache nodes, distributed across a large geographic region to provide faster and lower latency access to the content for the end users. In operation, content from the origin servers can be cached into the cache nodes, and can be requested via the cache nodes from the origin server when the content has not yet been cached. Cache nodes usually cache only a portion of the original source content rather than caching all content or data associated with an original content source. As such, content may need to be deleted or purged from the system based on updating the content, an administrator request to remove content from the nodes, a lack of use of the content, or for any other purpose.

In some implementations, cache nodes may include configuration services that are used to manage requests from end user devices. These configuration services often include varnish configuration language (VCL) services and other similar Hypertext Transfer Protocol (HTTP) accelerator services that are designed to be used to define request handling and document caching policies for content to be supplied to requesting end user devices. Although configuration services may assist in managing content requests, the configurations may be cumbersome and include various if-then statements that are difficult to modify and cause unnecessary delay in content requests. Further, because content delivery networks include a plurality of cache nodes, it may be difficult to maintain and synchronize the service configurations across the nodes of the network.

Overview

Described herein are enhancements for managing Hypertext Transfer Protocol (HTTP) accelerator services within a content delivery network. In one example, a method of operating a content delivery network with a plurality of cache nodes that cache content for end user devices includes, in a first cache node, receiving a content request from an end user device, and identifying a modification to at least one key-value pair in an edge dictionary based on the content request, wherein the edge dictionary comprises a key-value function for a Hypertext Transfer Protocol (HTTP) accelerator service and a plurality of key-value pairs. The method further provides, in the first cache node, generating a modified version of the edge dictionary based on the modification to the at least one key-value pair, and transferring a notification to at least one other cache node in the content delivery network, wherein the notification indicates the modification to the at least one key-value pair. The method also includes, in the at least one other cache node, implementing the modification in at least one edge dictionary corresponding to the modification.

BRIEF DESCRIPTION OF THE DRAWINGS

The following description and associated figures teach the best mode of the invention. For the purpose of teaching inventive principles, some conventional aspects of the best mode can be simplified or omitted. The following claims specify the scope of the invention. Note that some aspects of the best mode cannot fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 2 illustrates a method of operating a content delivery network to synchronize edge dictionaries.

DESCRIPTION

Figure 1:
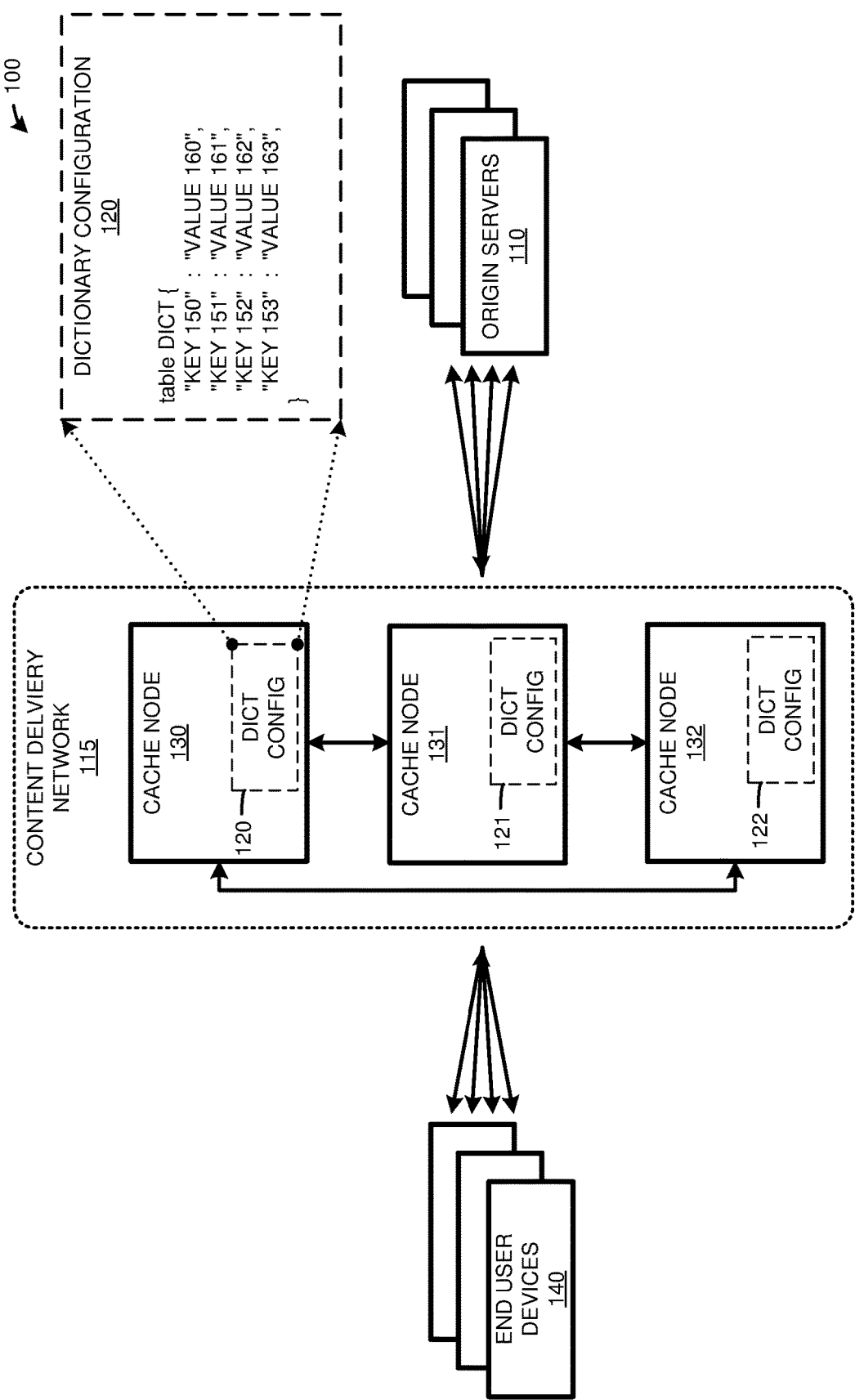
FIG. 1 illustrates a communication system to provide cached content to end user devices.

Network content, such as web page content, typically includes content such as text, hypertext markup language (HTML) pages, pictures, video, audio, animations, code, scripts, or other content viewable by an end user in a browser or other application. This various network content can be stored and served by origin servers and equipment. However, when a content delivery network is employed, the content delivery network can act as a proxy to cache content delivery between origin servers and the end user devices.

Content delivery networks can add a layer of caching between origin servers of the content providers and the end users. The content delivery networks typically have one or more cache nodes (CNs) distributed across a large geographic region to provide faster and lower latency local access to the content for the end users. When end users request content, such as a web page, a locally proximate cache node will respond to the content request instead of the associated origin server. Various techniques can be employed to ensure the cache node responds to content requests instead of the origin servers, such as associating web content of the origin servers with network addresses of the cache nodes.

In many examples of a CN, multiple network content sources are handled by a single CN. For example, a CN can be configured to cache website content of many different websites of many different website content originators. A CN may further only cache portions of the original content source to provide the most frequently accessed content to the end user devices. As a result, content and data objects that are stored on the cache node may need to be purged and updated to reflect changes in the source content, changes in the requests from the end user devices, or for a variety of other purposes.

In some implementations, Varnish Configuration Language (VCL) services or other Hypertext Transfer Protocol (HTTP) accelerator services may be employed by the content delivery network, wherein the services influence how requests are handled and how responses are given to content requests from end user devices. VCL files are organized into subroutines that are executed at different times. For example, one VCL file may be executed when a request is received, and another when files are fetched from the backend server. These VCL files often include a plurality of if-then statements that are used to implement administrator defined rules for various content requests.

Here, in addition to VCL or other similar configuration files that are executed by the individual CNs of the content delivery networks, each of the CNs are further provided with edge dictionaries. These edge dictionaries include functions with key-value pairs that can be referenced by the VCL operations to more efficiently determine conditions within a data request. For example, rather than using if-then statements to define rules for geoIP redirects to various versions of a webpage, a VCL may be configured to call an edge dictionary container to determine an appropriate domain for a request. In particular, the VCL file may may include a function call that calls the edge dictionary function. Once called, the edge dictionary may use the configured key-value pairs to determine the appropriate version of the webpage based on information or a "key" in the included request. The determined value may then be used by the VCL in providing the requested content to the end user device.

To further illustrate the example provided above, a sample edge dictionary is provided below that can be used to determine geoIP redirects for a particular service.

```
table geoip_redirect {
    "GB" : "www.example.co.uk",
    "IE" : "www.example.co.uk",
    "IT" : "www.example.com.it",
    "AU" : "www.example.com.au",
}
```

Here, the table includes four key-value pairs, wherein each pair includes a country code associated with the internet protocol (IP) address of the requesting end user, and an associated webpage for content associated with the IP address. Accordingly, when a request is generated from an IP address associated with the country code or "key" for GB, VCL may use the geoip_redirect table function to determine that the request should be directed to www.example.co.uk. Once determined, the content associated with the particular webpage may be provided using content either cached in the CN, or retrieved from the origin associated with the particular webpage.

In some implementations, the edge dictionaries that are implemented within the CNs of the content delivery network are dynamic based on the requests of the end user devices. In particular, edge dictionaries for blacklists and permissions lists may be updated based on the request provided to the end user. For example, if an end user requested a webpage that required a username and password, the cache node may query an origin server with the credentials provided from the end user. Once queried, and the device is authorized to access the content, the cache node may update at least one edge dictionary, permitting future content to be provided to the device without gathering permissions from the origin server. For example, a dictionary may include a "key" or identifier for the device and a "value" that indicates that the device is permitted to receive future content.

Once the edge dictionary is updated on the current CN servicing the end user device, the CN may further communicate notifications to other CNs indicating the addition, deletion, or other modification to the edge dictionary. In particular, although the end user device may initially communicate with a first CN, the device may transition to requesting content from another CN within the content delivery network. Consequently, to ensure that each of the CNs include the same configuration, a notification is transferred from the first CN to one or more of the other CNs of the network, indicating the permissions information for the end user device.

By maintaining edge dictionaries at each of the CNs of the content delivery network, changes may dynamically be implemented with content distribution rules without modifying lines of code within the VCL or other HTTP accelerator files. Instead, the edge dictionaries may be used as a dynamic database with a plurality of key-value pairs the reflect the current rules for the network, permitting VCL services or other HTTP accelerator services to address (using a function call) the database to determine current content distribution rules for the network.

FIG. 1 illustrates a communication network 100 to provide cached content to end user devices. Communication network 100 includes end user devices 140, content delivery network 115, and origin servers 110. Content delivery network 115 further includes cache nodes 130-132 with dictionary configurations 120-122. End user devices 130-132 may comprises computers, tablets, gaming consoles, mobile phones, or some other similar computing device capable requesting and receiving content from cache nodes 130-132 and origin servers 110.

In operation, end user devices 140 generate requests for network content, such as Internet web pages or media content such as videos, pictures, and music. Rather than using the origin servers to supply the requested content, a domain name server (DNS) may be used that directs the requests to a cache node in content delivery network 115. Upon receipt of a request, the cache node processes the requests and supplies the required content to the requesting device. Requested network content that is already stored in the cache node can be provided quickly to the end user devices, while network content that is not already stored in the content node can be responsively requested from origin servers 110 to be provided to the end user device. This content may, in some examples, be cached for future content requests by the same or other end user devices.

In the present implementation, to provide the caching operations, HTTP accelerator services, such as VCL services, are implemented to process the incoming content requests. VCL files are organized into subroutines that are executed at different times. For example, one VCL file may be executed when a request is received, and another when files are fetched from the backend server. These VCL files often include a plurality of if-then statements that are used to implement administrator defined rules for various content requests. These rules may include IP address blacklisting, geographic redirects for requests, permissions determinations, or any other similar rule related to incoming requests.

In addition to the VCL service files, cache nodes 130-132 use dictionary configurations 120-122, which represent edge dictionaries capable of being used by the VCL files. In the expanded example of dictionary configuration 120, keys 150-153 are associated with values 160-163 to provide a desired operation in the handling of content requests of end user devices. For example, dictionary configuration 120 may represent permissions for end user devices 140. Consequently, an end user device may provide an identifier or some other "key" in a content request to cache node 130. Responsive to the request, a VCL service may query dictionary configuration 120 using the "key" to determine whether the device is capable of accessing the requested content. If a permission "value" is found for the device, then the content will be provided as requested. If, however, a permission "value" is not found within dictionary configuration 120, cache node 130 may query origin servers 110 to determine whether the end user device is permitted to access the content. Based on the response, cache node 130 may provide the content as requested or prevent the end user for accessing the content. Further, based on the response from origin servers 110, dictionary configuration 120 may be updated to reflect the permissions for the end user device, permitting future content requests to occur without re-querying origin servers 110. This update may include adding, deleting, or modifying keys and values in the dictionary to accurately reflect the permissions of incoming devices.

To further demonstrate the operation of communication system 100, FIG. 2 is provided. FIG. 2 illustrates a method 200 of operating a content delivery network to synchronize edge dictionaries. The operations of FIG. 2 are referenced parenthetically in below with reference to elements of communication system 100 of FIG. 1.

As described in FIG. 1, content delivery network 115 and cache nodes 130-132 act as intermediaries that provide content to requesting end user devices, improving latency to the end user devices and limiting the load on origin servers 110. In the operations of method 200, a first cache node receives a content request from an end user device (201). In response to the request, the first cache node identifies a modification to at least one key-value pair in an edge dictionary based on the content request (202), and generates a modified version of the edge dictionary based on the modification to the at least one key-value pair (203). In particular, referring to communication system 100, each cache node of cache nodes 130-132 is configured with one or more edge dictionaries that act as references for VCL or other HTTP acceleration services executing on the nodes. These references permit executing VCL services to call an edge dictionary function to perform key-value matching tasks and provide a response to the query. For example, an edge dictionary may contain key-value pairs, wherein the "key" represents end user device identifiers and the "value" represents permissions for the end user device.

Although the edge dictionaries may be provided with an initial configuration, in some implementations, the edge dictionary may be required to be updated based on the request from the end user device. Referring to the permissions example above, if the end user device is a new device requesting content, the permissions for the device may not be received or cached from the origin server. Consequently, in response to the request, the cache node may transfer a request to the origin server for permission information associated with the end user device, and cache the information in the appropriate edge dictionary. Once cached in the edge dictionary, future requests from the same end user device may be processed locally by the edge dictionary without requiring a request to be transferred to the origin server. For example, if origin servers 110 returned key 153 and value 163 for a particular content request for an end user device over cache node 130, key 153 and value 163 may be added to dictionary configuration 120 for future content requests.

Once the modification is identified for the at least one key-value pair in the edge dictionary, the first cache node further transfers a notification to other cache nodes of the content delivery network, wherein the notification indicates the modification to the at least one key-value pair (204). In response to the notification, the other cache nodes implement the modification in edge dictionaries associated with the particular key-value pair modification (205). This notification permits the cache nodes to synchronize the edge dictionaries to satisfy end user requests. Referring again to the permissions example above, when a key-value pair is updated in an edge dictionary to reflect the permissions of a newly communicating end user device, the modified key-value pair may be transferred to other cache nodes in the network, permitting content to be served or denied to the device without interacting with the origin servers. Using the example of communication system 100, dictionary configuration 120 on cache node 130 may be updated to reflect a request by an end user device in end user devices 140. Once the modification is identified, cache node 130 may initiate a propagation of the modification to cache nodes 131-132 of content delivery network 115. In some implementations, cache node 130 may provide a notification to all of the required cache nodes of the network, however, in other implementations, cache node 130 may provide a notification to at least one other node, which in turn may provide a second notification to other nodes the system.

By notifying and updating dictionary configurations across multiple cache nodes, end user devices may transition to requesting content from other cache nodes while maintaining the configuration from the original node. Accordingly, if a device transitioned from cache node 130 to cache node 131, the permissions for the device may be maintained over the cache nodes. Further, by maintaining edge dictionaries at each of the cache nodes, VCL service versions may remain consistent, while required modifications to the edge dictionary functions are made that are referenced by the VCL service versions.

Figure 3A:
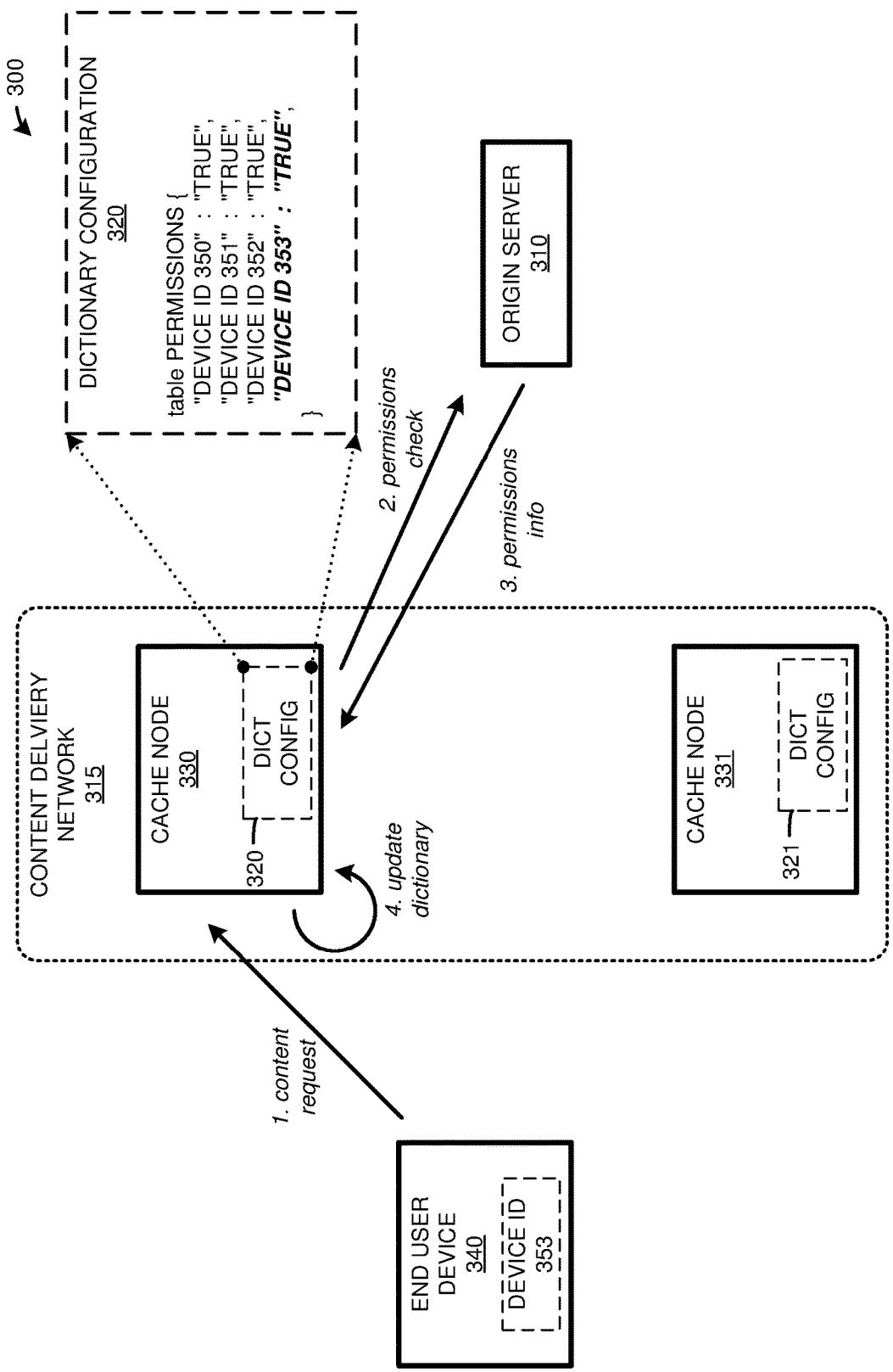
FIG. 3A illustrates an operational scenario of updating and synchronizing edge dictionaries between cache nodes.

FIG. 3A illustrates an operational scenario 300 of updating and synchronizing edge dictionaries between cache nodes. Operational scenario 300 includes end user device 340, content delivery network 315, and origin server 310. Content delivery network 315 includes cache nodes 330, which further include dictionary configurations 320-321. Dictionary configuration 320 comprises a permissions table function with device identifiers (IDs) 350-353 and values associated with content permissions for requesting end user devices.

In operation, end user device 340, at step 1, requests content, which is capable of being cached by content delivery network 315. Consequently, rather than be directed to the origin server associated with the content, a DNS may direct the requests to cache node 330. In response to the request, at step 2, cache node 330 may execute HTTP accelerator services, such as VCL services, and determine that a query to origin server 310 is required to satisfy the request. In the present example, the query comprises a permissions check to determine permissions information associated with end user device 340. This permissions check may include a username, a password, a key, an IP address, or any other similar permissions information associated with end user device 340. In some implementations, prior to transferring the permissions check, cache node 330 may use dictionary configuration 320 in combination with the HTTP accelerator services to determine if permission information for end user device 340 is already cached in the node. Once it is determined that the information is not cached, the permissions check may be forwarded to the origin server.

After the permissions check is received by origin server 310, origin server 310 identifies permission information for the end user device and provides, at step 3, the information to cache node 330. This permissions information may then be used by cache node 330 in determining whether to grant the content request generated by end user device 340. Further, the permissions information provided by origin server 310 may be used to update, at step 4, dictionary configuration 320 for use with future content requests. Here, the permissions information includes a device identifier (ID) 353 and a value of "TRUE" for end user device 340. This device identifier may comprise an IP address for the device, a key for the device, or any other similar device identifier that can be used in identifying future requests for the end user device. By updating dictionary configuration 320 with the identifier for the device and the value of "TRUE," cache node 330 may respond to future content requests of end user device 340 without querying origin server 310 for the permission information.

Figure 3B:
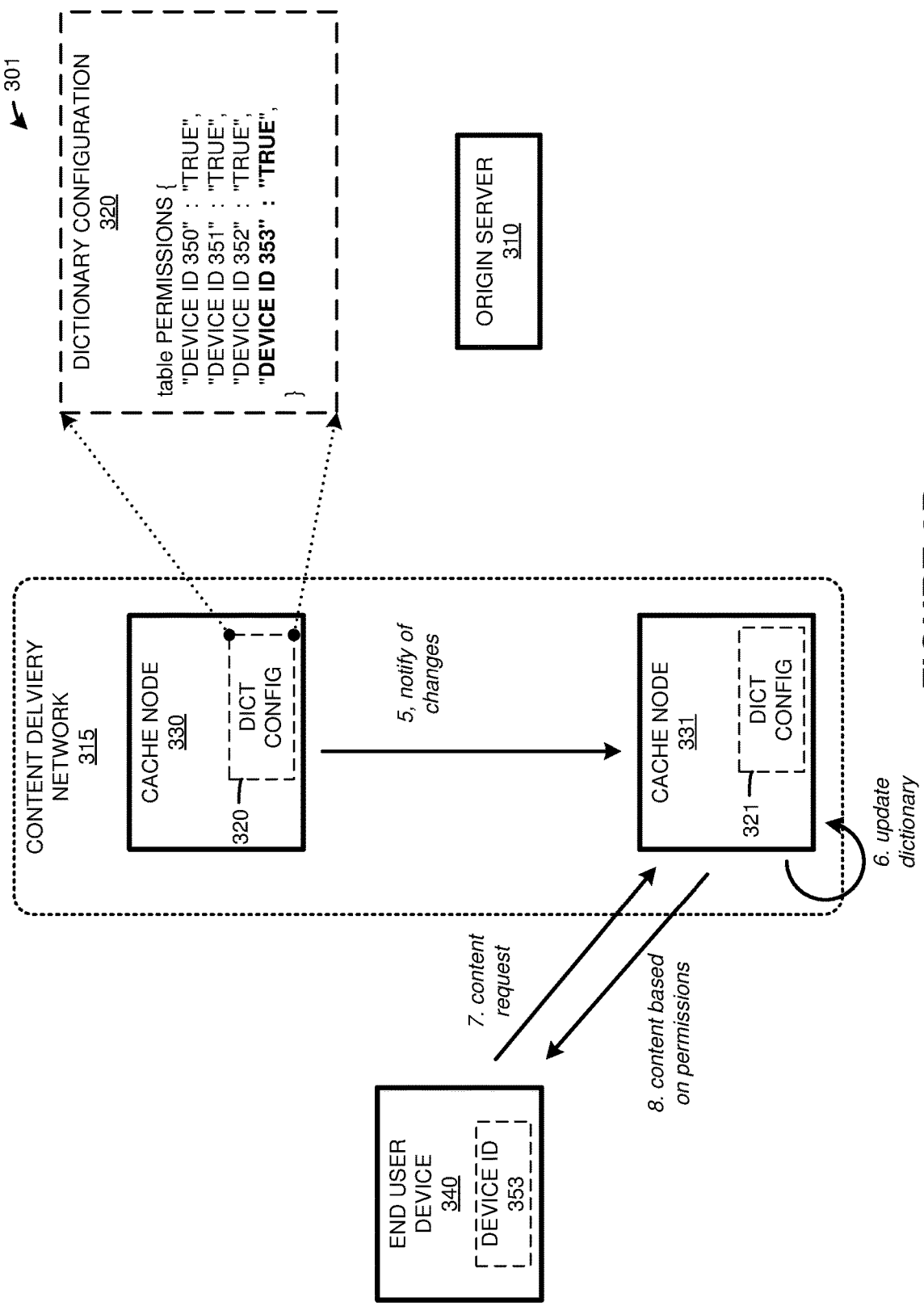
FIG. 3B illustrates an operational scenario of updating and synchronizing edge dictionaries between cache nodes.

To further demonstrate the operations of content delivery network 315, FIG. 3B is provided. FIG. 3B illustrates an operational scenario 301 of updating and synchronizing edge dictionaries between cache nodes, and is an extension of operational scenario 300 from FIG. 3A. FIG. 3B includes the same network elements and systems from FIG. 3A.

Once a modification is identified and implemented for dictionary configuration 320, cache node 330 may provide information about the modification to other nodes within content delivery network 315. This notification may be used by other nodes to update dictionary configurations with the information that was provided by origin server 310. Here, at step 5, cache node 330 transfers a notification of changes to cache node 331, wherein the changes include device ID 353 and the value of "TRUE." In response to receiving the notification, cache node 331, at step 6, updates dictionary configuration 321 with the information provided in the notification. For example, dictionary configuration 321 may include permissions information for the same content as dictionary configuration 320. As a result, when the modification is received from cache node 330, cache node 331 may implement the update in the appropriate local edge dictionary.

After the dictionary configuration 331 is updated with the modification for end user device 340, end user device 340 may initiate a second content request, at step 7, to retrieve content from cache node 331. In response to the content request, cache node 331, at step 8, provides content based on the permission information that is stored in dictionary configuration 321. In the present example, end user device 340 may provide device ID 353 in the content request to cache node 331, wherein the device ID may comprise a key, an IP address, or some other credential that can be used as a key for the edge dictionary. Once the device ID is supplied to cache node 331, the node may execute HTTP accelerator files that manage how the request should be processed by the cache node. Additionally, the HTTP accelerator files may reference dictionary configuration 321 and other edge services to determine whether end user device 340 has permission to access the requested content. Once checked using the dictionary configuration, content may be provided to end user device 340 based on the device ID credential supplied by the device.

Although illustrated in the present example as device permissions for the edge dictionary, it should be understood that a variety of other edge dictionaries may be implemented within a content delivery network. These edge dictionaries may include dictionaries for blacklists of devices that are prevented from requesting and receiving content from the network, geoIP redirect dictionaries that are used to direct devices to specific versions of a particular web service, or any other similar key-value dictionary that can be used in making determinations with regards to content requests from end user devices.

Figure 4:
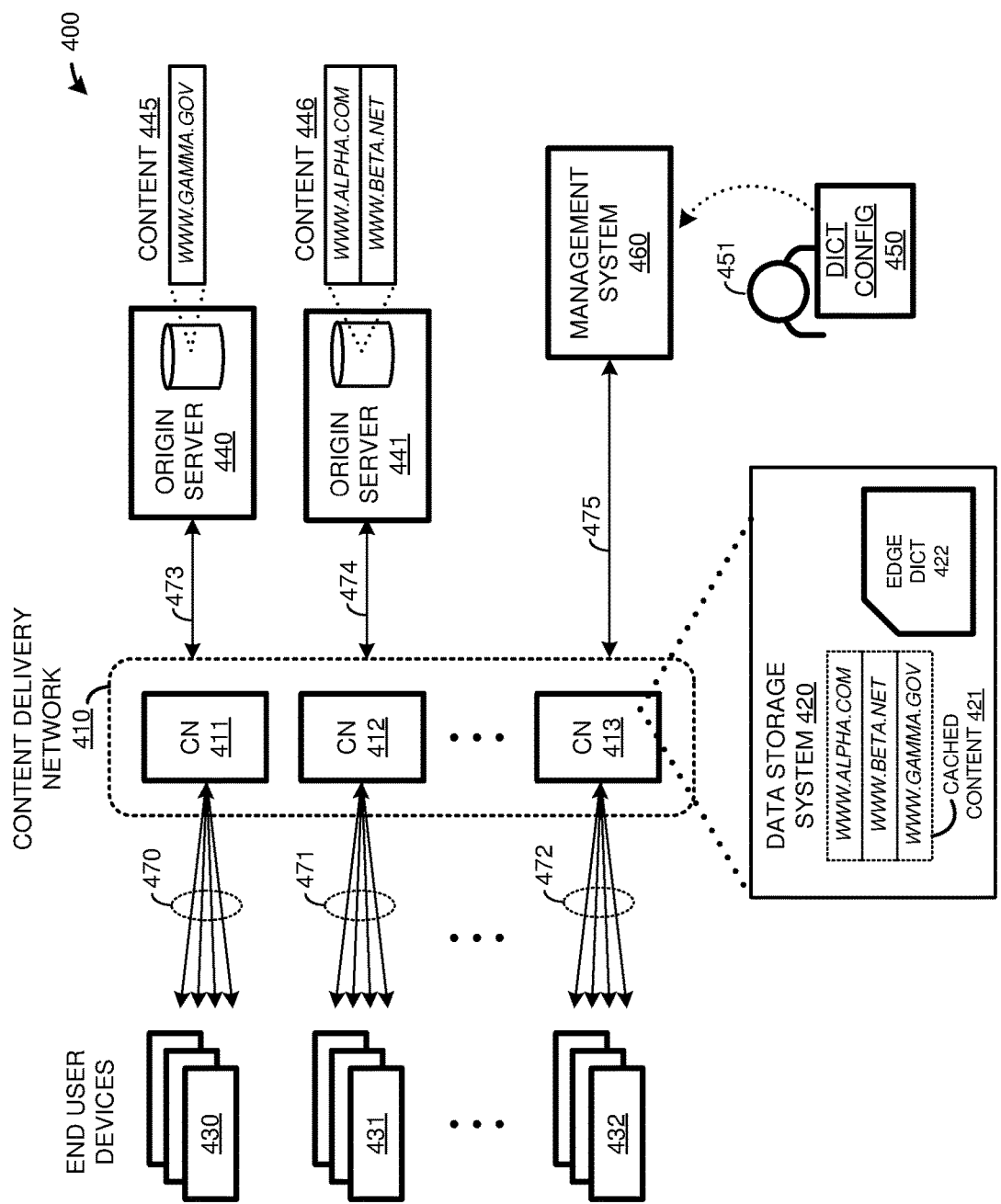
FIG. 4 illustrates a communication system to provide cached content to end user devices.

FIG. 4 illustrates a communication network 400 to provide content to end user devices via cache nodes. Communication system 400 includes content delivery network 410, end user devices 430-432, origin servers 440-441, and management system 460. Content delivery network 410 includes one or more cache nodes (CN) 411-413. Each of CN 411-413 can include one or more data storage systems, such as that illustrated for CN 413 as data storage system 420. Data storage system 420 can be an example of content data storage 420 of FIG. 4. End user devices 430-432 are representative of a plurality of end user devices, which can request and receive network content, and any number of end user devices 430-432 can be associated with each of cache nodes 411-413. CN 411-413 and ones of end users 430-432 communicate over associated network links 470-472. Content delivery network 410 and origin servers 440-441 communicate over associated network links 473-474. Content delivery network 410 and management system 460 communicate over link 475. Although not shown in FIG. 4 for clarity, each of CN 411-413 can also communicate with each other over network links.

To further illustrate FIG. 4, a brief description of the operation of communication system 400 is included. In operation, end user devices 430-432 request network content, such as content 445-446 associated with origin servers 440-441. Instead of these requests being handled by the individual origin servers 440-441, individual cache nodes 411-413 of content delivery network 410 receive the content requests over ones of links 470-472 and process the content requests for delivery of the content to the associated end user devices 430-432. Requested network content that is already stored in ones of CN 411-413 can be provided quickly to the end user devices, while network content that is not already stored in ones of CN 411-413 can be responsively requested by an associated one of CN 411-413 from an appropriate origin server 440-441 for delivery by the CN and possible caching by the CN. In this manner, each of CN 411-413 can act as intermediary proxy nodes to provide local and fast access for end user devices 430-432 to network content of origin servers 440-441 without burdening origin servers 440-441. FIG. 4 shows cached content 421 included in data storage system 420 of CN 413 as comprised of content 445-446, and thus content 445-446 is currently shown as cached by CN 413. Other configurations are possible, including subsets of content 445-446 being cached in individual ones of CN 411-413.

Although FIG. 4 shows content 445-446 of origin servers 440-441 being cached by data storage system 420, CN 411-413 can handle other content. For example, dynamic content generated by activities of end user devices 430-432 need not originally reside on origin servers 440-441, and can be generated due to scripting or code included in web page content delivered by CN 411-413. This dynamic content can also be cached by ones of CN 411-413, and can be specific to a particular end user device during a communication session.

Management system 460 handles configuration changes and status information for system operators and for the origin server operators or managers. For example, administrator 451 can use management system 460 to generate and modify dictionary configuration (dict config) 450 for content delivery network 410, wherein dictionary configuration 450 comprises one or more edge dictionary references to process content requests. Configuration 451 may alter the handling of content requests from end user devices 430-432, may alter the content that is supplied to end user devices 430-432, or may provide any other dictionary support to a VCL configuration or other HTTP accelerator configuration in content delivery network 410. Also, management system 460 can monitor status information for the operation of CN 411-413, such as operational statistics, and provide this status information to administrator 450. Although one management system is illustrated in the present example, it should be understood that any number of management systems may be employed.

As described herein, VCL files (or other HTTP accelerator files) are executed by CNs to manage the handling of incoming content requests from end user devices. These VCL files may ensure that particular IP addresses are blocked, particular IP addresses are forwarded to a specific domain name, or any other similar operation with a content request. In the present example, the VCL files for a particular service may use edge dictionaries, which act as a reference to lookup key-value pairs that can be used to make determinations on a specific request. In particular, a VCL service executing on the CN may call or reference, using a first "key," edge dictionary (edge dict) 422, which comprises a function to determine an action to take a particular request. Based on the included "key" in the request, a value may be returned to the the calling VCL to take the appropriate action with the request.

In some implementations, administrator 451 may provide dictionary configuration 450 to configure edge dictionaries in content delivery network 410. This configuration may include a configuration to generate a new edge dictionary, a configuration to add an edge dictionary to a current VCL configuration, a configuration to modify an edge dictionary, or a configuration to delete one or more entries in an edge dictionary. Further, to generate the configurations, administrator may use an API provided by the content delivery network 410 to implement dictionary configurations via management system 460. Accordingly, instead of generating a new VCL version for each modification, the administrator may use the API to communicate modifications to the dictionary used by the VCL version. Using the example in FIG. 4, when administrator 451 generates dictionary configuration 450 that is provided to content delivery network 410, management system 460 may apply the request based on the command in the API format to make changes to edge dictionary 422.

In some implementations, at least a portion of the edge dictionaries provided in content delivery network 410 may comprise dynamic edge dictionaries that may change based on content requests from end user devices. For example, based on a request from end user device 432, CN 413 may identify a modification to edge dictionary 422, and implement the required modification in at least one key-value pair for edge dictionary 422. Once implemented, CN 413 may transfer a notification indicating the modification to at least one other CN in content delivery network 410. This notification permits the at least one other CN to implement the required modification, and synchronizes the required changes across the nodes of the content delivery network.

Referring back to the elements of FIG. 4, CN 411-413, origin servers 440-441, and management system 460 can each include communication interfaces, network interfaces, processing systems, computer systems, microprocessors, storage systems, storage media, or some other processing devices or software systems, and can be distributed among multiple devices. Examples of CN 411-413, origin servers 440-441, and management system 460 can each include software such as an operating system, logs, databases, utilities, drivers, caching software, networking software, and other software stored on a computer-readable medium. Content delivery network 410, in addition to including CN 411-413, can include equipment and links to route communications between CN 411-413 and any of end user devices 430-432, origin servers 440-441, and management system 460, among other operations.

End user devices 430-432 can each be a user device, subscriber equipment, customer equipment, access terminal, smartphone, personal digital assistant (PDA), computer, tablet computing device, e-book, Internet appliance, media player, game console, or some other user communication apparatus, including combinations thereof.

Communication links 470-475 each use metal, glass, optical, air, space, or some other material as the transport media. Communication links 470-475 can each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 470-475 can each be a direct link or can include intermediate networks, systems, or devices, and can include a logical network link transported over multiple physical links. Although one main link for each of links 470-475 is shown in FIG. 4, it should be understood that links 470-475 are merely illustrative to show communication modes or access pathways. In other examples, further links can be shown, with portions of the further links shared and used for different communication sessions or different content types, among other configurations. Communication links 470-475 can each include many different signals sharing the same associated link, as represented by the associated lines in FIG. 4, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

Figure 5:
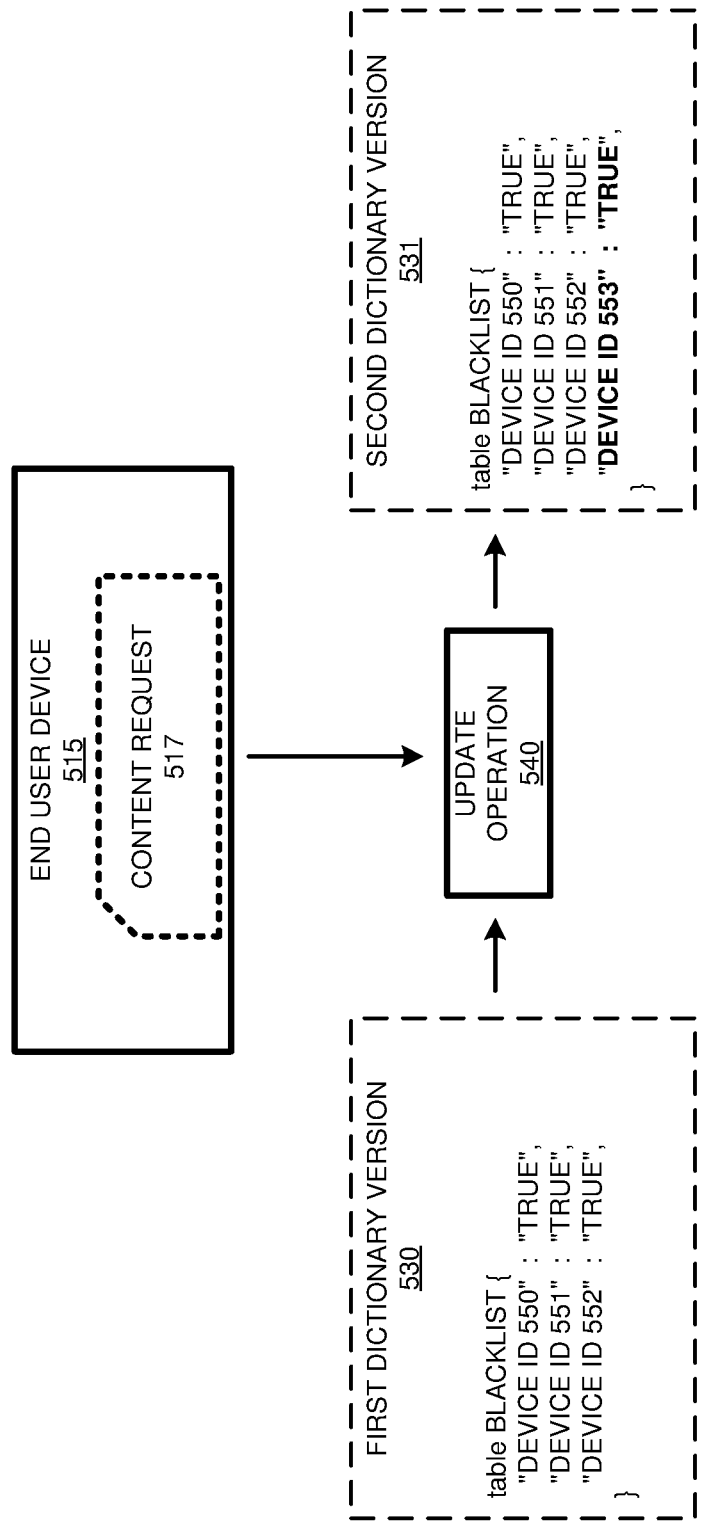
FIG. 5 illustrates an overview of updating an edge dictionary on a cache node.

FIG. 5 illustrates an overview of updating an edge dictionary on a cache node. Overview 500 includes end user device 515, first dictionary version 530, second dictionary version 531, and update operation 540. First dictionary version 530 and second dictionary version 531 are representative of edge dictionary versions that may be implemented as software operations in a cache node. Update operation 540 is representative of a software operation executing on a cache node to update a dictionary based on content requests of end user devices.

As illustrated in FIG. 5, end user device 515 initiates a content request 517 that is transferred over a communication network to a cache node. In response to receiving the content request, update operation 540 is executed by the cache node, wherein update operation 540 may include HTTP accelerator service operations, as well as update services associated with the edge dictionaries of the content node. In some implementations, in response to the request from end user device 515, the cache node may determine if the required information to service the request is already cached on the cache node. If the information is already cached, such as if the device is already flagged to be blacklisted, the cache node may respond to the request, accordingly. However, if the information is not located in the node to process the request, the cache node may provide additional operations to add the necessary information to the local edge dictionaries.

In the present example, based on content request 517, update operation 540 consists of determining if end user device 515 is blacklisted and should be prevented from receiving content from the cache node. This blacklist operation may include communicating with an origin or other server managing a blacklist for communicating devices, or may include a calculation operation, which may determine to blacklist devices based on a number of content requests over a particular time period. Once it is determined that end user device 515 should be blacklisted, update operation may modify first dictionary version 530 to make second dictionary version 531 with the identifier for end user device 515. In particular, update operation may add a "key" of device ID 553, which corresponds to an identifier for end user device 515, and may also add a "value" of true to indicate that the device should be prevented from accessing content using the cache node.

After update operation 540, future requests from end user device 515 may be processed using the HTTP accelerator service and second dictionary version 531 to determine whether content should be served to the end user device. Accordingly, when a second request is received from end user device 515, the HTTP accelerator service may call the dictionary function, determine that the device has been blacklisted from receiving content, and prevent the request from further being processed.

Although illustrated in the example of FIG. 5 using blacklist reference function for the edge dictionary, it should be understood that other edge dictionaries may be used by cache nodes to provide desired operations associated with content requests. In some implementations, the HTTP accelerator service and the associated edge dictionaries may be configured on a per service provider basis. For example, a first organization or company may be provided with separate accelerator and edge dictionary services than a second organization or company. However, in some implementations, in addition to the separate accelerator and edge dictionary services, one or more HTTP accelerator service files and edge dictionaries may be shared between multiple organizations. For instance, multiple organizations may share a blacklist edge dictionary capable of preventing improper devices from accessing content of the organizations.

Figure 6:
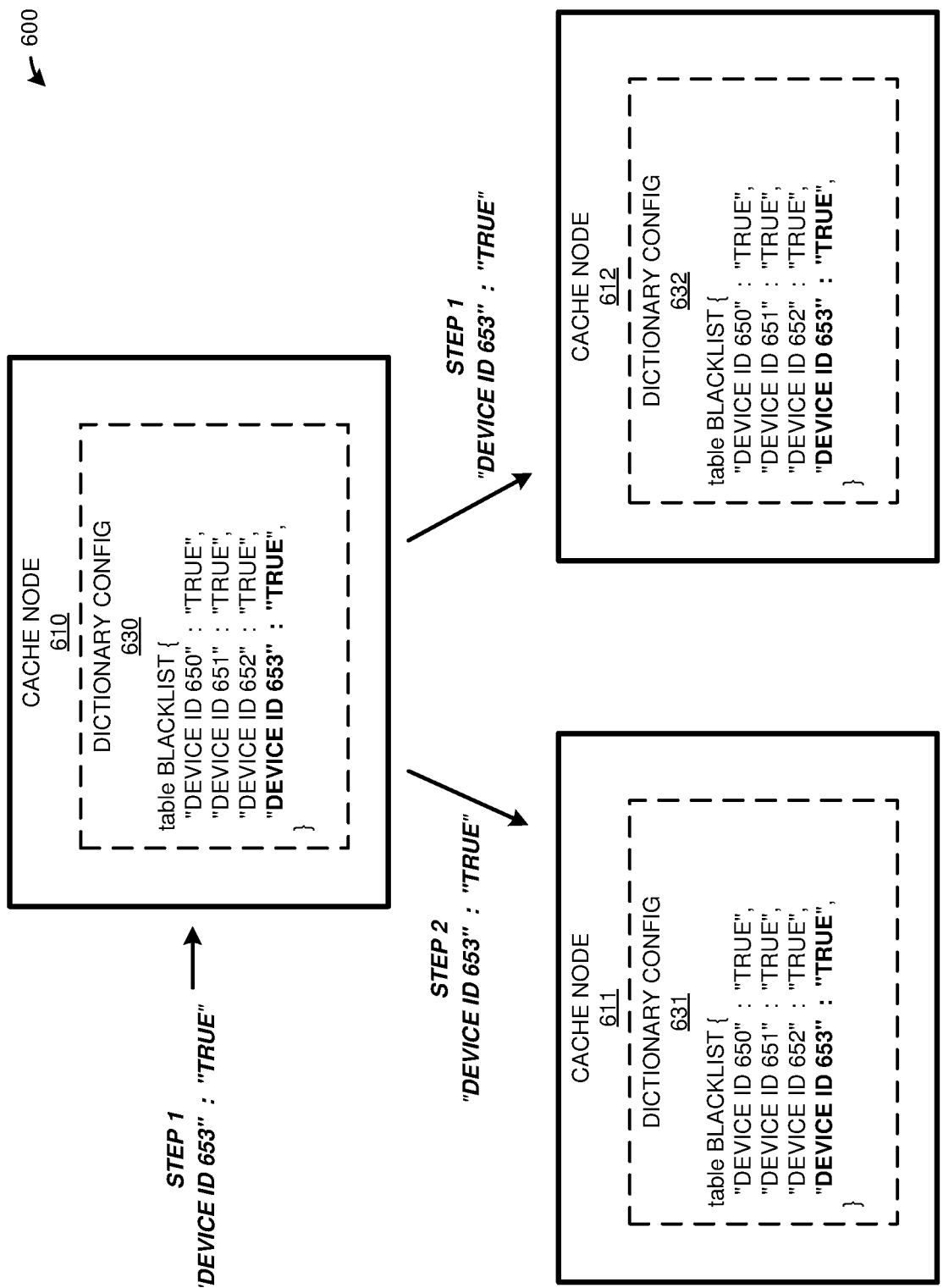
FIG. 6 illustrates an overview of providing edge dictionary updates between cache nodes.

FIG. 6 illustrates an overview 600 of providing edge dictionary updates between cache nodes. Overview 600 includes cache nodes 610-612, which each include a dictionary configuration of dictionary configurations 630-632. Dictionary configurations 630-632 are representative of a configuration that is local to each of the cache nodes capable of providing similar operations. In the particular example of overview 600, dictionary configurations 630-632 are representative of edge dictionary reference functions capable of preventing devices from receiving content from the content delivery network.

As described herein, cache nodes are configured to receive content requests from end user devices over a communication network, and respond to the requests based on HTTP accelerator operations and edge dictionary configurations. In some implementations, based on a request from an end user device, modifications are required to edge dictionaries to respond to future requests. Here, cache node 610 receives, at step 1, a request from an end user device that generates a modification to dictionary configuration 630, wherein the modification comprises an addition to the list of blacklisted devices. This blacklist key-value pair addition may be based on information provided from an origin or other management system, or may be determined based on a quantity of requests from the end user device over a period of time meeting defined criteria. Once the modification is determined for dictionary configuration 630, the modification is added to the configuration, permitting the modification to be used in future received communications. In particular, in response to a second communication request from the device, the HTTP accelerator service may query dictionary config 630 with a "key" identifier for the device and, in response to the query, dictionary config 630 may determine that the device is to be blacklisted based on the value of "TRUE."

Once the modification is identified for dictionary configuration 630 on cache node 610, at step 2, cache node 610 may provide a notification to other cache nodes in the content delivery network, indicating the modification to the dictionary configuration. In response to receiving the notification, cache nodes 611-612 may update local dictionary configurations 631-632 with the appropriate modification. In some implementations, the notification that is provided to the cache node may indicate the modification to be implemented, as well as the appropriate dictionary that the modification should be made to.

Further, in some examples, time stamps may be included with the modification notification. This time stamp may permit each of the cache nodes to resolve inconsistencies between modification notifications. For example, referring to a permissions dictionary example, if a first modification notification included permissions for a first device, but a second notification with a timestamp later than the first modification notification included permissions that excluded the first device, the cache node may implement the modification with the later time stamp, removing the modification with the earlier timestamp.

Although illustrated in the previous examples as providing information about a single modification to a dictionary configuration, it should be understood that the notifications transferred between cache nodes may include information about any number of key-value changes. For example, the modification information may be transferred between the nodes at predefined periods, may be transferred to other cache nodes when a threshold number of modifications are made to local dictionaries, or at any other similar interval. Further, the cache nodes that are selected for transmittal of the modification may be based on a predetermined pattern, may be random, or may be determined based on any other distribution function to the other cache nodes of the content delivery network. For example, if a predetermined pattern is used in the distribution of modification information, cache node 610 may be configured to always provide modification information to cache nodes 611-612.

While illustrated in the example of overview 600 with a single notification transfer between cache nodes, it should be understood that cache nodes 611-612 may further be configured to forward the modification, with device ID 653, to one or more additional cache nodes. For example, cache node 611 may compile any modifications identified locally at cache node 611, combine the local modifications with the modifications reported from other nodes, and forward the summarized modifications to other nodes of the content delivery network.

Figure 7:
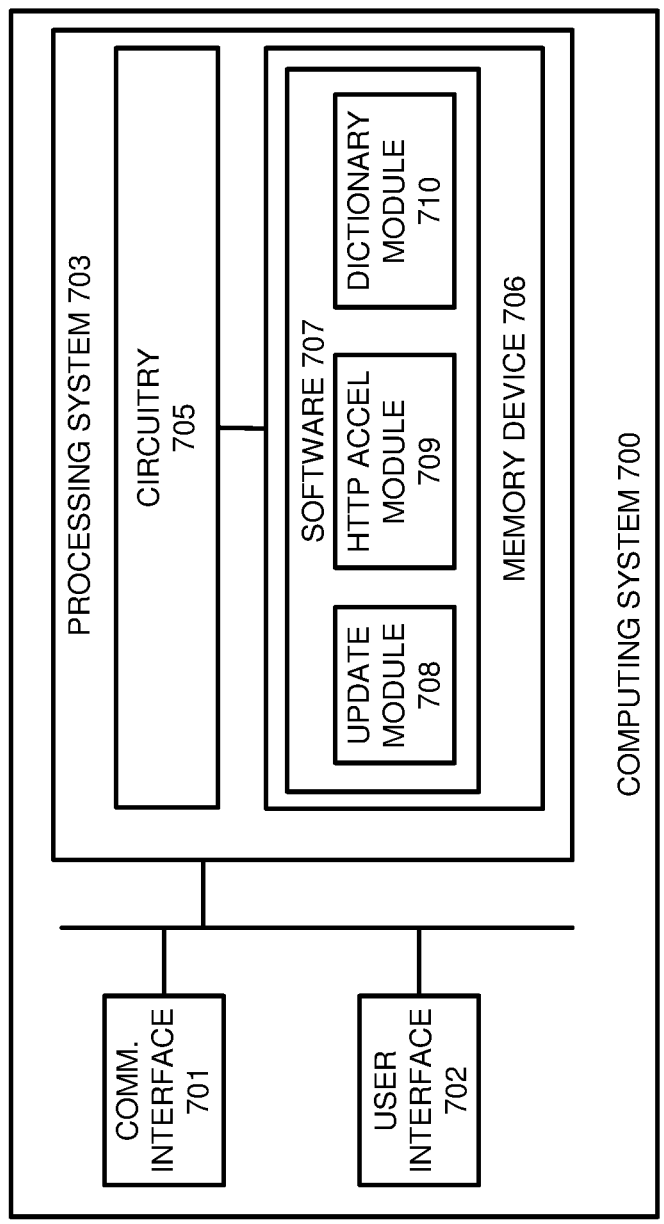
FIG. 7 illustrates a computing system to update and synchronize edge dictionaries between cache nodes.

FIG. 7 illustrates a computing system 700 to update and synchronize edge dictionaries between cache nodes. Computing system 700 is an example of a cache node described in FIGS. 1-6, although other examples may exist. Computing system 700 comprises communication interface 701, user interface 702, and processing system 703. Processing system 703 is linked to communication interface 701 and user interface 702. Processing system 703 includes processing circuitry 705 and memory device 706 that stores operating software 707.

Communication interface 701 comprises components that communicate over communication links, such as network cards, ports, radio frequency (RF) transceivers, processing circuitry and software, or some other communication devices. Communication interface 701 may be configured to communicate over metallic, wireless, or optical links. Communication interface 701 may be configured to use time-division multiplexing (TDM), IP, Ethernet, optical networking, wireless protocols, communication signaling, or some other communication format—including combinations thereof.

User interface 702 comprises components that interact with a user. User interface 702 may include a keyboard, display screen, mouse, touch pad, or some other user input/output apparatus. User interface 702 may be omitted in some examples.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Operating software 707 comprises computer programs, firmware, or some other form of machine-readable processing instructions. Operating software 707 includes update module 708, HTTP accelerator (accel) module 709, and dictionary module 710, although any number of software modules may provide the same operation. Operating software 707 may further include an operating system, utilities, drivers, network interfaces, applications, or some other type of software. When executed by circuitry 705, operating software 707 directs processing system 703 to operate computing system 700 as described herein.

In at least one implementation, computing system 700 is configured to cache content to be provided to end user devices from one or more origin services. This content may comprise Internet webpages, pictures, movies, audio files, or any other similar distributed content. During the operation of computing system 700, software 707 directs processing system 703 to receive, via communication interface 701, content requests from end user devices. In response to a content request, HTTP accelerator module 709 directs processing system 703 to process the content requests, wherein the processing includes how the initial requests are handled and how responses are given to content requests from end user devices. In particular, HTTP accelerator module 709 may include one or more files that can define rules, such as geoIP redirect rules, blacklisting rules, permission determination rules, or any other similar rules for providing content to the requesting end user.

Here, in addition to HTTP accelerator module 709, software 707 further includes dictionary module 710, which may include one or more edge dictionaries that act as callable functions by the HTTP accelerator functions of HTTP accelerator module 709. For example, a geoIP redirect dictionary may be referred to by an HTTP accelerator function with a country code associated with the end user. Once called, the redirect dictionary can use the country code and return the appropriate domain for the end user device using the key-value pairs associated with the edge dictionary function.

In some implementations, the edge dictionaries of edge dictionary module 710 may be dynamic based on the requests provided by end user devices. These dynamic edge dictionaries may include dictionaries that provide blacklist reference functions, dictionaries that provide authentication reference functions for end user devices, or any other similar edge dictionary that may change based on end user requests. To implement the modifications, update module 708 directs processing system 703 to identify a modification to at least one key-value pair in an edge dictionary based on a content request from an end user device, generate a modified version of the edge dictionary based on the modification to the at least one key-value pair, and transfer a notification to at least one other cache node of the content delivery network.

As an illustrative example, a content request may require permissions for a device to access particular content. As a result, computing system 700 may first query the origin server to determine if the device is permitted to access the content (if a dictionary key-value pair is not currently cached), generate a key-value pair based on the permission information provided by the origin server, and implement the key-value pair in a permissions edge dictionary function associated with the particular content. Once the key-value pair is identified that reflects the permissions for the end user device, a notification may be transferred to other cache nodes of the content delivery network, identify the modification to the edge dictionary.

In addition to identifying modifications to local edge dictionaries based on content requests from end user devices, update module 708 may further direct processing system 703 to receive and implement modifications transferred from other cache nodes of the network. Referring to the permissions example above, other cache nodes may provide permission key-value pairs that identify whether particular end user devices are capable of receiving content. Once the key-value pairs are received from the other nodes, computing system 700 may implement the modifications in associated local edge dictionaries of dictionary module 710.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein can be in the form of a functional diagram, operational sequence, or flow diagram, and can be described as a series of acts, it is to be understood and appreciated that the methodologies are not limited by the order of acts, as some acts can, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology can be required for a novel implementation.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above.

What is claimed is:

1. A method of operating a content delivery network with a plurality of cache nodes that cache content for end user devices, the method comprising:
   in a first cache node, receiving a content request from an end user device;
   in the first cache node, identifying a modification to at least one key-value pair in an edge dictionary based on the content request, wherein the edge dictionary comprises a reference key-value function for a Hypertext Transfer Protocol (HTTP) accelerator service and a plurality of key-value pairs;
   in the first cache node, generating a modified version of the edge dictionary based on the modification to the at least one key-value pair;
   in the first cache node, transferring a notification to at least one other cache node in the content delivery network, wherein the notification indicates the modification to the at least one key-value pair; and
   in the at least one other cache node, implementing the modification in at least one edge dictionary corresponding to the modification.

2. The method of claim 1, wherein the edge dictionary comprises a blacklist reference function or a user authentication reference function.

3. The method of claim 1, wherein the HTTP accelerator service comprises a varnish configuration language (VCL) service.

4. The method of claim 1, wherein identifying the modification to the at least one key-value pair in the edge dictionary comprises:
   transferring a request to an origin server to determine permissions for the end user device; and
   receiving permission information for the end user device from the origin server.

5. The method of claim 1, wherein identifying the modification to the at least one key-value pair in the edge dictionary comprises:
   determining a quantity of requests from the end user device over a period of time;
   determining that the quantity of requests meets quantity criteria;
   generating a blacklist key-value pair based on an identifier for the end user device.

6. The method of claim 5, wherein the blacklist key-value pair comprises an internet protocol (IP) address for the end user device.

7. The method of claim 1, further comprising:
   in the first cache node, receiving, from a second cache node, a second notification, wherein the second notification indicates a second modification to the edge dictionary; and
   in the first cache node and in response to the second notification, implementing the second modification in the modified version of the edge dictionary.

8. A content delivery network that caches content for end user devices, the content delivery network comprising:
   a first cache node configured to:
      receive a content request from an end user device;
      identify a modification to at least one key-value pair in an edge dictionary based on the content request, wherein the edge dictionary comprises a reference key-value function for a Hypertext Transfer Protocol (HTTP) accelerator service and a plurality of key-value pairs;
      generate a modified version of the edge dictionary based on the modification to the at least one key-value pair; and
      transfer a notification to at least one other cache node in the content delivery network, wherein the notification indicates the modification to the at least one key-value pair; and
   the at least one other cache node configured to:
      implement the modification in at least one edge dictionary corresponding to the modification.

9. The content delivery network of claim 8, wherein the edge dictionary comprises a blacklist reference function or a user authentication reference function.

10. The content delivery network of claim 8, wherein the HTTP accelerator service comprises a varnish configuration language (VCL) service.

11. The content delivery network of claim 8, wherein the first cache node configured to identify the modification to the at least one key-value pair in the edge dictionary is configured to:
    transfer a request to an origin server to determine permissions for the end user device; and
    receive permission information for the end user device from the origin server.

12. The content delivery network of claim 8, wherein the first cache node configured to identify the modification to the at least one key-value pair in the edge dictionary is configured to:
    determine a quantity of requests from the end user device over a period of time;
    determine that the quantity of requests meets quantity criteria;
    generate a blacklist key-value pair based on an identifier for the end user device.

13. The content delivery network of claim 12, wherein the blacklist key-value pair comprises an internet protocol (IP) address for the end user device.

14. The content delivery network of claim 8, wherein the first cache node is further configured to:
    receive, from a second cache node, a second notification, wherein the second notification indicates a second modification to the edge dictionary;
    in response to the second notification, implement the second modification in the modified version of the edge dictionary.

15. A computer apparatus to manage edge dictionaries in a content delivery node of a content delivery network, the computer apparatus comprising:
    at least one non-transitory computer readable media; and
    processing instructions stored on the at least one non-transitory computer readable media that, when executed by a processing system, direct the processing system to:
       receive a content request from an end user device;

identify a modification to at least one key-value pair in an edge dictionary based on the content request, wherein the edge dictionary comprises a reference key-value function for a Hypertext Transfer Protocol (HTTP) accelerator service and a plurality of key-value pairs;

generate a modified version of the edge dictionary based on the modification to the at least one key-value pair; and transfer a notification to at least one other cache node in the content delivery network, wherein the notification indicates the modification to the at least one key-value pair.

16. The apparatus of claim 15, wherein the edge dictionary comprises a blacklist reference function or a user authentication reference function.

17. The apparatus of claim 15, wherein the HTTP accelerator service comprises a varnish configuration language (VCL) service.

18. The apparatus of claim 15, wherein the processing instructions to identify the modification to the at least one key-value pair in the edge dictionary direct the processing system to:

transfer a request to an origin server to determine permissions for the end user device; and receive permission information for the end user device from the origin server.

19. The apparatus of claim 15, wherein the processing instructions further direct the processing system to, in response to the content request, determine whether a key-value pair in the plurality of key-value pairs is available to satisfy the content request, and wherein the processing instructions to identify the modification to the at least one key-value pair in the edge dictionary based on the content request direct the processing system to, if a key-value pair in the plurality of key-value pairs is not available to satisfy the content request, identify the modification to the at least one key value pair in the edge dictionary based on the content request.

20. The apparatus of claim 15, wherein the modification to the at least one key-value pair comprises one of an add action to add a new key-value pair, a delete action to remove an existing key-value pair, or a change action to change an existing key-value pair.

* * * * *